United States Patent [19]
Tominaga et al.

[11] Patent Number: 5,637,371
[45] Date of Patent: Jun. 10, 1997

[54] PHASE CHANGE OPTICAL RECORDING MEDIUM AND ACTIVATION ENERGY DETERMINING METHOD

[75] Inventors: Junji Tominaga; Ryo Inaba, both of Nagano; Susumu Haratani, Chiba, all of Japan

[73] Assignee: TDK Corporation, Tokyo, Japan

[21] Appl. No.: 600,169

[22] Filed: Feb. 12, 1996

[30]     Foreign Application Priority Data

Feb. 21, 1995 [JP] Japan .................................. 7-056630

[51] Int. Cl.$^6$ .................................................. B32B 3/00
[52] U.S. Cl. .................. 428/64.1; 428/64.4; 428/64.5; 428/64.6; 428/913; 430/270.12; 430/270.13; 430/495.1; 430/945; 369/283; 369/288
[58] Field of Search .................. 428/64.1, 64.2, 428/64.4, 64.5, 64.6, 913; 430/270.1, 270.11, 270.12, 270.13, 495.1, 945; 369/283, 288

[56]         References Cited

U.S. PATENT DOCUMENTS 5,389,417   2/1995   Tominaga et al. .
5,418,030   5/1995   Tominaga et al. .

FOREIGN PATENT DOCUMENTS 3-240590   10/1991   Japan .
4-232779    8/1992   Japan .

OTHER PUBLICATIONS

Phase–Change Optical Recording Films with Ag–In–Te–Sb System; Phase Change Recording Conference Nov. 24, 1994; Matsushita et al.

Primary Examiner—Patrick Ryan
Assistant Examiner—Elizabeth Evans
Attorney, Agent, or Firm—Watson Cole Stevens, Davis, PLLC

[57]         ABSTRACT

An optical recording medium comprising a phase change recording layer and a dielectric layer on a substrate is improved in reliability during storage at elevated temperature when the recording layer has a composition of the following formula.

$$[\{(Ag,Au)_a(Sb,Bi)_b(Te,Se)_c\}_{1-d}(In,Al,P)_d]_{1-e}M_e$$

Letters a to e are: $0<a \leq 0.20$, $0.6 \leq b < 1$, $0 < c < 0.40$, $a+b+c=1$, $0<d<0.06$, and $0 \leq e \leq 0.20$. The recording layer should have an activation energy of at least 3.0 eV as determined from the crystallization temperature versus heating rate of the recording layer sandwiched between dielectrics.

7 Claims, 2 Drawing Sheets

PHASE CHANGE OPTICAL RECORDING MEDIUM AND ACTIVATION ENERGY DETERMINING METHOD

BACKGROUND OF THE INVENTION

1. Field of the Invention

This invention relates to an optical recording medium adapted to record information in a recording layer by irradiating a light beam thereto to induce a crystallographic change. It also relates to a method for determining the activation energy of thin films such as phase change films and magneto-optical recording films of optical recording media.

2. Prior Art

Highlight is recently focused on optical recording media capable of recording information at a high density and erasing the recorded information for rewriting. One typical rewritable optical recording medium is of the phase change type wherein laser light is directed to the recording layer to change its crystallographic state whereupon a change of reflectance by the crystallographic change is detected. Optical recording media of the phase change type are of great interest since they can be overwritten by a single light beam and operated by a drive unit with a relatively simple optical system as compared with magneto-optical recording media.

Most optical recording media of the phase change type used Ge—Te systems which provide a substantial difference in reflectance between crystalline and amorphous states and have a relatively stable amorphous state. It was recently proposed to use new compounds known as chalcopyrites. Chalcopyrite compounds were investigated as compound semiconductor materials and have been applied to solar batteries and the like. The chalcopyrite compounds are composed of Ib-IIIb-VIb$_2$ or IIb-IVb-Vb$_2$ as defined in terms of the Groups of the Periodic Table and have two stacked diamond structures. The structure of chalcopyrite compounds can be readily determined by X-ray structural analysis and their basic characteristics are described, for example, in Physics, Vol. 8, No. 8 (1987), pp. 441 and Denki Kagaku (Electrochemistry), Vol. 56, No. 4 (1988), pp. 228.

Among the chalcopyrite compounds, AgInTe$_2$ is known to be applicable as a recording material by diluting it with Sb or Bi. The resulting optical recording media are generally operated at a linear velocity of about 7 m/s. See Japanese Patent Application Kokai (JP-A) No. 240590/1991, 99884/1991, 82593/1991, 73384/1991, and 151286/1992.

In addition to these phase change type optical recording media using chalcopyrite compounds, JP-A 267192/1992, 232779/1992, and 166268/1994 disclose phase change type optical recording media wherein a recording layer crystallizes to create an AgSbTe$_2$ phase.

Japanese Patent Application Nos. 108996/1992, 179267/1992, 253832/1992, 17968/1993, 341818/1993, and 87854/1994 by the inventors disclose phase change optical recording media having recording layers based on Ag, Sb, Te, and In to which V, Ti or the like is added for improving reliability and other properties. However, these media which have been recorded at a high linear velocity are less reliable when stored at elevated temperature. For example, those media having vanadium added to the recording layer for reliability improvement which are recorded at a linear velocity of 4 m/s or higher have the problem that amorphous record marks crystallize in about 200 hours during storage in an environment at 80° C. Japanese Patent Application Nos. 179267/1992 and 17968/1993 have a corresponding U.S. Pat. No. 5,418,030. Japanese Patent Application No. 253832/1992 has a corresponding U.S. Pat. No. 5,389,417. Japanese Patent Application No. 341818/1993 has a corresponding U.S. Pat. No. 5,470,628. Japanese Patent Application No. 87854/1994 has a corresponding U.S. patent application Ser. No. 08/400,765.

SUMMARY OF THE INVENTION

Therefore, an object of the present invention is to provide a phase change type optical recording medium having improved reliability after storage in an elevated temperature environment.

Another object of the present invention is to provide a method for accurately determining the activation energy of thin films such as phase change recording films.

Regarding phase change recording layers based on an AgSbTe$_2$ phase, we have found that the activation energy associated with amorphous-crystal transition is closely related to the crystallization of record marks during storage in an elevated temperature environment. When the recording layer as incorporated in a medium rather than standing alone has an activation energy of at least 3.0 eV, the medium is significantly improved in reliability during storage in an elevated temperature environment.

According to one aspect of the present invention, there is provided an optical recording medium comprising a substrate, a phase change recording layer thereon, and a dielectric layer on the recording layer. The recording layer has a composition of the following formula and an activation energy of at least 3.0 eV.

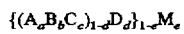

$$\{(A_aB_bC_c)_{1-d}D_d\}_{1-e}M_e$$

In the formula, A is at least one element of silver and gold, B is at least one element of antimony and bismuth, C is at least one element of tellurium and selenium, D is indium or a mixture of indium and at least one of aluminum and phosphorus, M is at least one element selected from the group consisting of Ti, Zr, Hf, V, Nb, Ta, Mn, W, and Mo. Letters a, b, c, d, and e representing atomic ratios fall in the range: $0<a\leq0.20$, $0.6\leq b<1$, $0<c<0.40$, $a+b+c=1$, $0<d<0.06$, and $0\leq e\leq0.20$.

Preferably, the activation energy of the recording layer is determined from the crystallization temperature versus heating rate of the recording layer sandwiched between dielectrics. The crystallization temperature of the recording layer is typically determined by measuring its light transmittance or reflectance.

In another aspect of the present invention, the activation energy of a thin film is determined by heating a thin film sandwiched between dielectrics at a rate, measuring the crystallization temperature of the thin film, and determining the activation energy from the crystallization temperature versus the heating rate. The thin film is preferably 10 to 100 nm thick. The crystallization temperature is typically determined by measuring the light transmittance or reflectance of the thin film.

Typical of prior art methods for determining the activation energy of thin films is Kissinger method. This method is to determine activation energy from the relationship of crystallization temperature to heating rate. One example of determining activation energy by Kissinger method is described in Preprints of the 6th Phase Change Recording Research Meeting by the Japanese Applied Physics Society, page 27. In this article, activation energy is determined by forming a phase change film on a glass surface, scraping off the film, and measuring the crystallization temperature of the scraped mass by differential scanning calorimetry (DSC). This method, however, often fails to provide an accurate measurement because the film material is oxidized upon measurement of a crystallization temperature and surface properties of the film are altered by scraping off.

As opposed to the prior art methods, the present invention is to determine the activation energy of a thin film such as a phase change film by Kissinger method while the thin film is sandwiched between dielectrics. The dielectric sandwich prevents the thin film from oxidation and from altering its properties upon measurement.

In general, phase change optical recording media and magneto-optical recording media have recording layers which are as thin as 100 nm or less and sandwiched between dielectrics in the media. The recording layers are thus strongly affected by the quantum size effect. More particularly, since thin films have an extremely small dimension in a thickness direction as compared with in-plane directions, their energy level is discontinuous and their electron level in a thickness direction is restricted (see Advances in Physics, 1993, vol. 42, No. 2, pp. 173–266). The effect of interfacial tension at the interface with dielectric during crystal transition is outstanding. As a result, the activation energy determined by the prior art methods is higher than the activation energy in an actual medium, failing to provide a true evaluation. As opposed to this, by sandwiching a thin film between dielectrics, the present invention has succeeded in reproducing a thin film in the same state as in an actual medium and taking in the quantum size effect.

The optical recording medium of the invention remains highly reliable during storage at elevated temperatures because a recording layer of a specific composition having an activation energy of at least 3.0 eV as measured by the inventive method is effective for restraining record marks from crystallizing at elevated temperatures.

Note that the above-cited article relating to the activation energy of phase change films describes a maximum activation energy of 3.0 eV. Since the phase change film is not sandwiched between dielectrics in the article, it is presumed that the actual activation energy in a medium is far below 3.0 eV. The composition reported in the article as exhibiting an activation energy of 3.0 eV is $AgInTe_2:Sb=1:1$. This composition gives an indium content of 12.5 at %, which is above the range of the present invention. In general, an excess of indium is inadequate for media to be recorded, erased and read at a high linear velocity because the excess indium prohibits growth of $AgSbTe_2$ crystal. Moreover, $AgInTe_2$ is considered predominant in the above-referred article and the present invention is different from the article in this respect too.

BRIEF DESCRIPTION OF THE DRAWINGS

These and further features of the present invention will be apparent with reference to the following description and drawings, wherein.

DETAILED DESCRIPTION OF THE INVENTION

Figure 1:
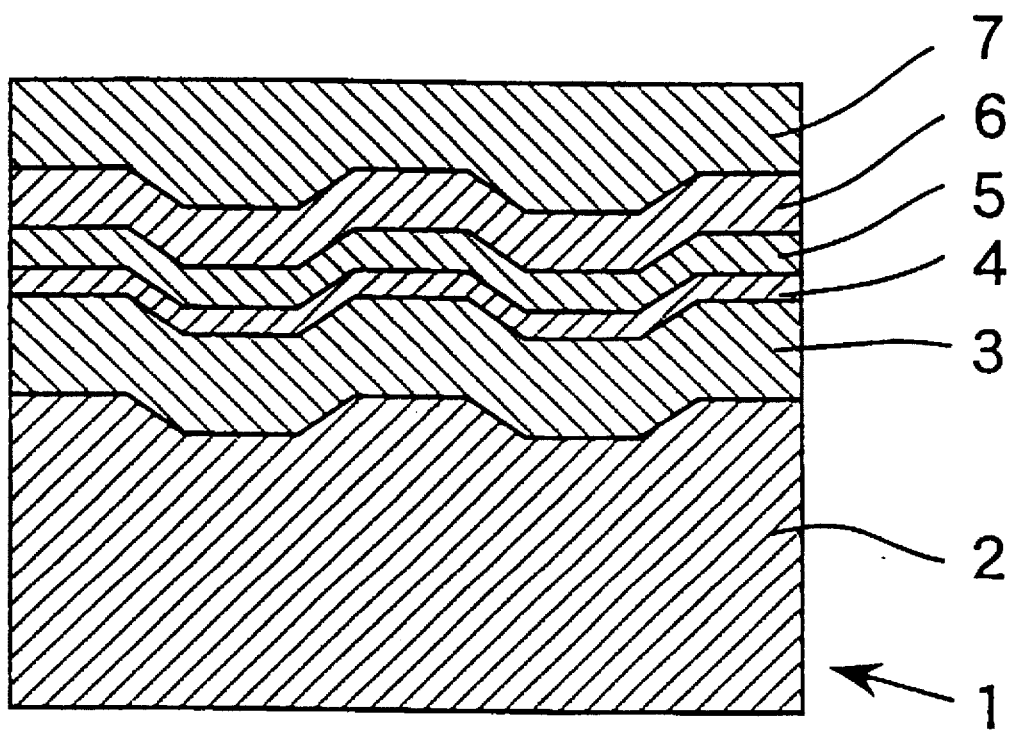
FIG. 1 is a schematic cross-sectional view of an optical recording medium according to one embodiment of the invention.

An optical recording medium has a phase change recording layer on a substrate. The recording layer contains elements A, B, C, D and preferably M wherein A is silver (Ag) and/or gold (Au), B is antimony (Sb) and/or bismuth (Bi), C is tellurium (Te) and/or selenium (Se), D is indium (In) or a mixture of indium and at least one of aluminum (Al) and phosphorus (P), and M is at least one element selected from the group consisting of Ti, Zr, Hf, V, Nb, Ta, Mn, W, and Mo.

This recording layer is recorded such that unrecorded areas are crystalline and record marks are amorphous or microcrystalline.

The unrecorded area preferably contains an $ABC_2$ phase such as $AgSbTe_2$ phase as a crystalline phase. The $ABC_2$ phase is mainly responsible for a change of reflectance of the recording layer. More preferably, the unrecorded area contains a B phase such as Sb phase as well as the $ABC_2$ phase. The B phase is a crystalline phase.

D in the recording layer is present bound to C, specifically as a D-C phase such as In-Te phase in the unrecorded area. The D-C phase is a crystalline phase composed mainly of D and C wherein D:C is regarded substantially 1:1.

The presence of the respective phases is acknowledgeable by a transmission electron microscope, electron probe microanalysis (EPMA), etc.

Preferably the recording layer further contains element M which is at least one element selected from the group consisting of titanium, zirconium, hafnium, vanadium, niobium, tantalum, manganese, tungsten, and molybdenum. It is believed that element M is effective for reducing the crystal transition rate (the rate at which an amorphous or microcrystalline material grows into coarse crystals) by obstructing $ABC_2$ from changing its crystal structure. The reason of addition of element M is described below. When the linear velocity of the recording layer relative to a recording light beam is slow, the thermal influence of a light beam can flood over the irradiated spot. In a phase change type optical recording medium using a recording material of an Ag—Sb—Te system, the region heated by a light beam is quenched to convert into an amorphous or microcrystalline state whereby a signal is recorded. For signal recording areas of long wavelength signals such as 11T signals, a slow linear velocity allows a first irradiated spot to be sequentially slightly heated by the influence of an adjacent subsequently irradiated spot so that the first irradiated spot slowly cools down, resulting in a less amorphous or microcrystalline recorded mark. As a result, C/N and repetitive recording capability are lost. Since element M is effective for reducing the crystal transition rate by restraining crystal growth, it is easy to form amorphous or microcrystalline recorded marks even at a slow relative linear velocity. This ensures a good C/N and a high modulation factor as well as improved repetitive overwrite capability. Among elements M, titanium and vanadium, especially titanium, are more effective for reducing the crystal transition rate. Vanadium and titanium, especially vanadium, are also effective for improving reliability under deleterious conditions such as hot humid conditions. It is then preferred that one or both of titanium and vanadium, especially vanadium, occupies at least 80 at %, especially 100 at % of the entire M.

The recording layer should have an activation energy of at least 3.0 eV, preferably at least 3.2 eV. If the recording layer has a lower activation energy, amorphous record marks tend to crystallize during storage at elevated temperatures. The upper limit of activation energy is not critical although it is generally about 5 eV.

The activation energy of the recording layer is determined by the activation energy determining method according to the invention. More particularly, measurement is done as follows using Kissinger method.

A test sample is first prepared by forming a layer to be measured such that it is sandwiched between dielectrics. Specifically, a layer to be measured is formed on a substrate of glass or resin and then covered with a dielectric layer. Alternatively, a sample is prepared by successively depositing a dielectric layer, a layer to be measured, and another dielectric layer on a substrate. The layer to be measured is formed to the same thickness as a recording layer in an actual medium. It is preferred that dielectric layers be provided on opposite sides of the layer to be measured as in an actual medium. With respect to the dielectric layers, their material may be suitably selected from the materials used in upper and lower dielectric layers of a medium as will be described later and their thickness may be suitably selected from the range of at least 10 nm, more preferably at least 30 nm. If one or both of the dielectric layers are too thin, they are less effective for preventing oxidation and taking in the quantum size effect. No upper limit is imposed on the thickness of dielectric layers although they need not exceed 200 nm in thickness.

The crystal transition temperature of the layer to be measured is measured by heating the layer at a rate. This measurement is done at least three times while changing the heating rate (Vt). For example, the sample is heated from about room temperature at a rate selected from the range of 0.30 to 5.0 K/min., preferably 0.50 to 3.0 K/min. for measuring a crystallization temperature (Tx). The crystallization temperature is preferably judged by a change of light transmittance or reflectance. There are obtained at least three sets of Vt and Tx. In a diagram, $1/Tx$ and $\ln(Vt/Tx^2)$ are plotted on the abscissa and ordinate, respectively. A straight line is drawn connecting at least three points plotted. Activation energy is obtained from the gradient of the line.

The measuring method of the invention is applicable to measurement of the activation energy of thin films other than the phase change film. For example, the present method is applicable to measurement of magneto-optical recording films and optical glass as well as measurement of the decomposition rate of dyes and diffusion rate of alloys. The thickness of thin films to which the measuring method of the invention is applicable is not particularly limited although the invention is advantageously applicable to thin films of about 10 to 100 nm thick, especially 15 to 60 nm thick. For measurement of thin films other than phase change films, the dielectrics sandwiching the layer to be measured may be the same as in the case of measurement of phase change films.

In the optical recording medium of the invention, the recording layer has a composition of the following formula:

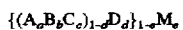

wherein A, B, C, D, and M are as defined above, letters a, b, c, d, and e representing atomic ratios fall in the range:

$0 < a \leq 0.20$,
$0.6 \leq b < 1$,
$0 < c < 0.40$,
a+b+c=1,
$0 < d < 0.06$, and
$0 \leq e \leq 0.20$.

Preferably, a, b, c, d, and e fall in the range:
$0.03 \leq a \leq 0.18$,
$0.70 \leq b \leq 0.85$,
$0.10 \leq c \leq 0.35$,
a+b+c=1,
$0.02 \leq d \leq 0.05$, and
$0.001 \leq e \leq 0.10$.

The reason of limitation of a to e, especially to the preferred range, is described below.

In the formula, too small values of a would obstruct smooth re-crystallization of recorded marks and hence, repetitive overwriting. Too large values of a would render the recording layer less reliable. That is, recorded marks would tend to crystallize during storage at elevated temperature, resulting in drops of C/N and modulation factor. Repetition of recording would facilitate deterioration of C/N and modulation factor.

If b is below the range, the proportion of B phase in the unrecorded portion would be low so that a differential reflectance concomitant with a phase change is increased, but a crystal transition rate is drastically slowed down to impede erasing. If b is beyond the range, a differential reflectance concomitant with a phase change would be reduced to provide a lower modulation factor and crystal transition is accelerated.

If c is below the range, the amount of C to form the $ABC_2$ phase would be short and the proportion of $ABC_2$ phase declines. In turn, A becomes excessive, forming A phase and undesirable phases other than $ABC_2$ phase. Then element A little diffuses from the recorded mark to the unrecorded portion during recording, or inversely, A diffuses into the recorded marks. Little reliability improvement is achieved or reliability is rather reduced. If c is beyond the range, element C would become excessive even after formation of $ABC_2$ and D-C phases, forming a C phase which lowers a crystal transition rate to impede erasing.

If d is below the range, the proportion of D-C phase would decrease. Since the D-C phase functions to preclude growth of $ABC_2$ phase crystal grains, a lower proportion of D-C phase helps $ABC_2$ phase crystal grains grow. Then recorded marks are insufficiently rendered amorphous, resulting in drops of modulation factor and reliability. If d is beyond the range, the growth of $ABC_2$ phase crystal grains is prohibited and erasing is difficult.

If e is below the range, a too fast crystal transition rate would result in low C/N and unacceptable repetitive overwrite capability. If is beyond the range, a differential reflectance concomitant with a phase change would become too small to provide a modulation factor.

Element A is Ag and/or Au, preferably Ag. Preferably Ag occupies at least 50 atom %, more preferably at least 80 atom % of the entire A. Most preferably only Ag is used as element A. If the proportion of Au in the entire element A is too high, a crystal transition rate would be too fast to provide a satisfactory modulation factor and C/N.

Element B is Sb and/or Bi, preferably Sb. Preferably Sb occupies at least 50 atom %, more preferably at least 80 atom % of the entire B. Most preferably only Sb is used as element B. If the proportion of Bi in the entire element B is too high, a recording layer would have an increased coefficient of absorption to reduce optical interference, resulting in a reduced reflectance difference between crystalline and amorphous states and hence, a low C/N.

Element C is Te and/or Se, preferably Te. Preferably Te occupies at least 50 atom %, more preferably at least 80 atom % of the entire C. Most preferably only Te is used as element C. If the proportion of Se in the entire element C is too high, a crystal transition rate would be too slow to provide a satisfactory erasing factor.

Element D is In or a mixture of In and Al and/or P. Preferably In occupies at least 60 atom %, more preferably at least 80 atom % of the entire D. If the proportion of In in the entire element D is too low, reliability would be low. Upon recording, in recorded marks, Ag diffuses outward and instead of Ag, In bonds with Te to form an In—Te crystal. Although microcrystalline nuclei of In—Te obstruct crystal growth of $ABC_2$ phase such as $AgSbTe_2$ phase, a smaller amount of In results in a smaller number of microcrystalline nuclei of In—Te, which allows microcrystalline nuclei of $ABC_2$ to bind together to grow. This implies that recorded marks are less stable. The proportion of Al and P is not critical.

In addition to the above-mentioned recording material, the recording layer may contain a minor amount of impurities, for example, Cu, Ni, Zn, Fe, oxygen, nitrogen and carbon. The total amount of these impurities should preferably be up to 0.05 atom %.

The composition of the recording layer is determinable by electron probe microanalysis (EPMA), X-ray microanalysis, etc.

The recording layer generally has a coefficient of absorption k of about 3.3 in a crystalline state and about 2.2 in a microcrystalline or amorphous state.

The recording layer preferably has a thickness of about 10 to 50 nm, especially about 13 to 30 nm. If the recording layer is too thin, the growth of a crystalline phase would be retarded and a reflectance change concomitant with a phase change would become insufficient. If the recording layer is too thick, much A would diffuse through the recording layer in a direction perpendicular to its surface and less A would diffuse through the recording layer in a direction parallel to its surface (or in-plane direction) upon formation of a recorded mark, resulting in the recording layer losing reliability.

The recording layer may be formed by conventional processes, preferably sputtering and evaporation processes, most often sputtering. For sputtering, a single alloy target may be used. A multiple source sputtering technique using a plurality of targets of metals alone or alloys is also useful. Since the recording layer is amorphous as sputtered or deposited, it must be initialized before recording. Initialization is often accomplished by means of a bulk eraser for effecting crystallization of the recording layer.

It is possible to form a crystallized recording layer by dividing the sputtering process into two or three steps. More specifically, the recording layer forming step includes in an adjacent manner the step of sputtering an A-C base metal composed mainly of elements A and C and the step of sputtering a B base metal composed mainly of element B. The B base metal may contain D. Alternatively, the recording layer forming step may include adjacent to the B base metal sputtering step, the step of sputtering a D base metal composed mainly of D. M may be contained in at least one of the A-C base metal, B base metal and D base metal. This divided sputtering process does not form part of the present invention, but is the subject matter of the copending application (corresponding to Japanese Patent Application No. 47822/1995 filed Feb. 13, 1995).

Referring to FIG. 1, there is illustrated one preferred configuration of the optical recording medium according to the present invention. The optical recording medium 1 has a lower dielectric layer 3, a recording layer 4, an upper dielectric layer 5, a reflective layer 6, and a protective layer 7 on a substrate 2.

Since the optical recording medium is adapted to be recorded and read by directing a light beam to the recording layer 4 through the substrate 2, the substrate 2 is preferably formed of a material substantially transparent to such a light beam, for example, resins and glass. For ease of handling and low cost, resins are preferred substrate materials. A choice may be made among various resins such as acrylic resins, polycarbonate, epoxy resins and polyolefins. The shape and dimensions of the substrate are not critical although it is generally of disc shape having a diameter of about 50 to 360 mm and a thickness of about 0.5 to 3 mm. The substrate surface may be provided with a predetermined pattern of grooves for tracking and addressing purposes.

The lower dielectric layer 3 plays the role of preventing oxidation of the recording layer 4 and protecting the substrate by shutting off the heat which can otherwise conduct from the recording layer to the substrate upon recording. The upper dielectric layer 5 plays the role of protecting the recording layer and helps the heat remaining in the recording layer after completion of recording release through heat transfer. The lower and upper dielectric layers 3 and 5 are made of any desired dielectric material, for example, silicon oxide such as $SiO_2$, silicon nitride such as $Si_3N_4$, zinc sulfide such as ZnS, mixtures thereof, various transparent ceramics and various species of glass. Also useful are so-called LaSiON materials containing La, Si, O, and N, so-called SiAlON materials containing Si, Al, O, and N, SiAlON containing yttrium, etc. Preferred among these are those materials having a refractive index of at least 1.4, especially at least 1.8 in the wavelength range of 400 to 850 nm. This wavelength range covers 780 nm which is the wavelength used in current CD players and 680 nm which is a candidate wavelength of the next generation recording technology and represents the range over which the optical recording medium of the invention is advantageously operated. Preferred examples of the dielectric material are $Si_3N_4$, a mixture of ZnS and $SiO_2$, a mixture of ZnS and $Si_3N_4$, and a mixture of ZnS and $Ta_2O_5$.

The lower dielectric layer 3 is preferably about 50 to 300 nm thick, more preferably 100 to 250 nm thick. Within this thickness range, the lower dielectric layer is effective for preventing any damage to the substrate upon recording and higher modulation is available. The upper dielectric layer 5 is preferably about 10 to 60 nm thick. This thickness range ensures a fast cooling rate and thus permits to define a recorded mark with a clear edge, resulting in reduced jitter. Also higher modulation is available. Each of the upper and lower dielectric layers 3 and 5 may be formed of two or more dielectric laminae of different compositions as will be described later. The dielectric layers are preferably formed by gas phase growth methods such as sputtering and evaporation.

The reflective layer 6 may be formed of any desired material, typically high reflectance metals, for example, Al, Au, Ag, Pt, and Cu alone or alloys containing at least one of these metals. The reflecting layer is preferably about 30 to 150 nm thick. Reflectance would be short with a thickness below this range. A thickness beyond this range would provide no further improvement in reflectance and add to the cost. The reflecting layer is preferably formed by gas phase growth methods such as sputtering and evaporation.

The protective layer 7 is provided for improving scratch resistance and corrosion resistance. Preferably the protective layer is formed of organic materials, typically radiation curable compounds or compositions thereof which are cured with radiation such as electron and UV radiation. The protective layer is generally about 0.1 to 100 µm thick and may be formed by conventional techniques such as spin coating, gravure coating, spray coating, and dipping.

In another preferred embodiment of the invention, in order that the optical recording medium have a higher reflectance, the lower dielectric layer includes at least one laminate consisting of two dielectric laminae having different refractive index. The dielectric lamina having a higher refractive index in the laminate is disposed adjacent to the substrate. In this embodiment, a higher refractive index layer, a lower refractive index layer, a recording layer, an upper dielectric layer, a reflective layer, and a protective layer are deposited on a substrate in the described order.

Described below is how to operate the optical recording medium of the invention for writing and reading.

After manufacture of the optical recording medium of the invention, the recording layer is initialized or crystallized if necessary. For recording, a recording light beam, typically laser beam is directed to the recording layer in crystalline state to define a spot whereby the recording material is melted within the irradiated spot. After removal of the recording light beam, the temperature of the spot drops quickly so that the spot becomes substantially amorphous or microcrystalline to form a recorded spot or mark.

When it is desired to rewrite the recorded information, a recording light beam is directed to a spot of the recording layer where a signal is to be newly written while an erasing light beam is continuously directed to the remaining spots. The spots where the erasing light beam is irradiated are heated, but the temperature is relatively low and does not exceed the melting point of the recording material because the erasing light beam is of relatively low power as compared with the recording light beam. However, the erasing light beam is irradiated over a wide area, the resultant heat accumulation provides a gentle temperature gradient so that the cooling rate is slower than the crystal transition rate, allowing for crystallization. The record spot is once melted upon exposure to the recording light beam, but remains in the amorphous or microcrystalline state because the heat is quickly diffused toward the reflective layer. Accordingly, upon rewriting, whether the recording material is crystalline or amorphous (or microcrystalline) before irradiation, those portions irradiated with the recording light beam all become amorphous (or microcrystalline) and those portions irradiated with the erasing light beam all become crystalline. Overwrite recording is done in this way. Such overwrite recording can be carried out by using a single light beam which is modulated into recording and erasing light beams.

Preferably the recording light beam is emitted in pulses. By recording a single signal with two or more pulses of irradiation, the heat accumulation at the record mark is minimized and the swelling of a trailing edge of the record mark known as a teardrop phenomenon is minimized, resulting in improved C/N. The pulse irradiation also provides an increased erasing coefficient.

The power Pw of the recording light beam and the power Pe of the erasing light beam may be empirically determined. The reading light beam should have a low power which does not affect the crystallographic state of the recording layer. Understandably the signal recorded marks in amorphous or microcrystalline state give a lower reflectance than the unrecorded portions in crystalline state.

Preferably the optical recording medium of the invention is operated by rotating it to provide a relative speed of the recording layer relative to the recording light beam of about 1 to 30 m/s, more preferably 4 to 25 m/s, especially 6 to 20 m/s. In general, if the relative speed is high, the recording layer is cooled at a too high rate upon recording to allow for sufficient diffusion of element A, resulting in low reliability. The present invention improves reliability at higher relative speeds and thus ensures satisfactory operation at the above-defined range of relative speed.

EXAMPLE

Examples of the present invention are given below by way of illustration and not by way of limitation.

A test sample to be measured for activation energy was prepared by depositing a lower dielectric layer, a recording layer, and an upper dielectric layer on one surface of a glass substrate. The lower dielectric layer was formed by sputtering a target of ZnS and $SiO_2$. The value of $SiO_2/(ZnS + SiO_2)$ was 15 mol %. The lower dielectric layer was 170 nm thick. The recording layer was formed by RF sputtering an antimony target having chips of Ag, In, Te, and V attached thereto. The recording layer was 20 nm thick. The upper dielectric layer was formed by the same procedure as the lower dielectric layer to a thickness of 170 nm.

This test sample was measured for activation energy of the recording layer by Kissinger method. The sample was set in a Gold Image electric furnace where the sample was heated at a suitable rate while passing a semiconductor laser beam across the sample. The temperature at which light transmittance dropped was a crystallization temperature. The heating rate was changed among 2 K/min., 1 K/min., 0.7 K/min., and 0.5 K/min. The measurements were plotted in a graph. Activation energy was determined from the gradient of a line connecting the plots as previously mentioned.

Figure 2:
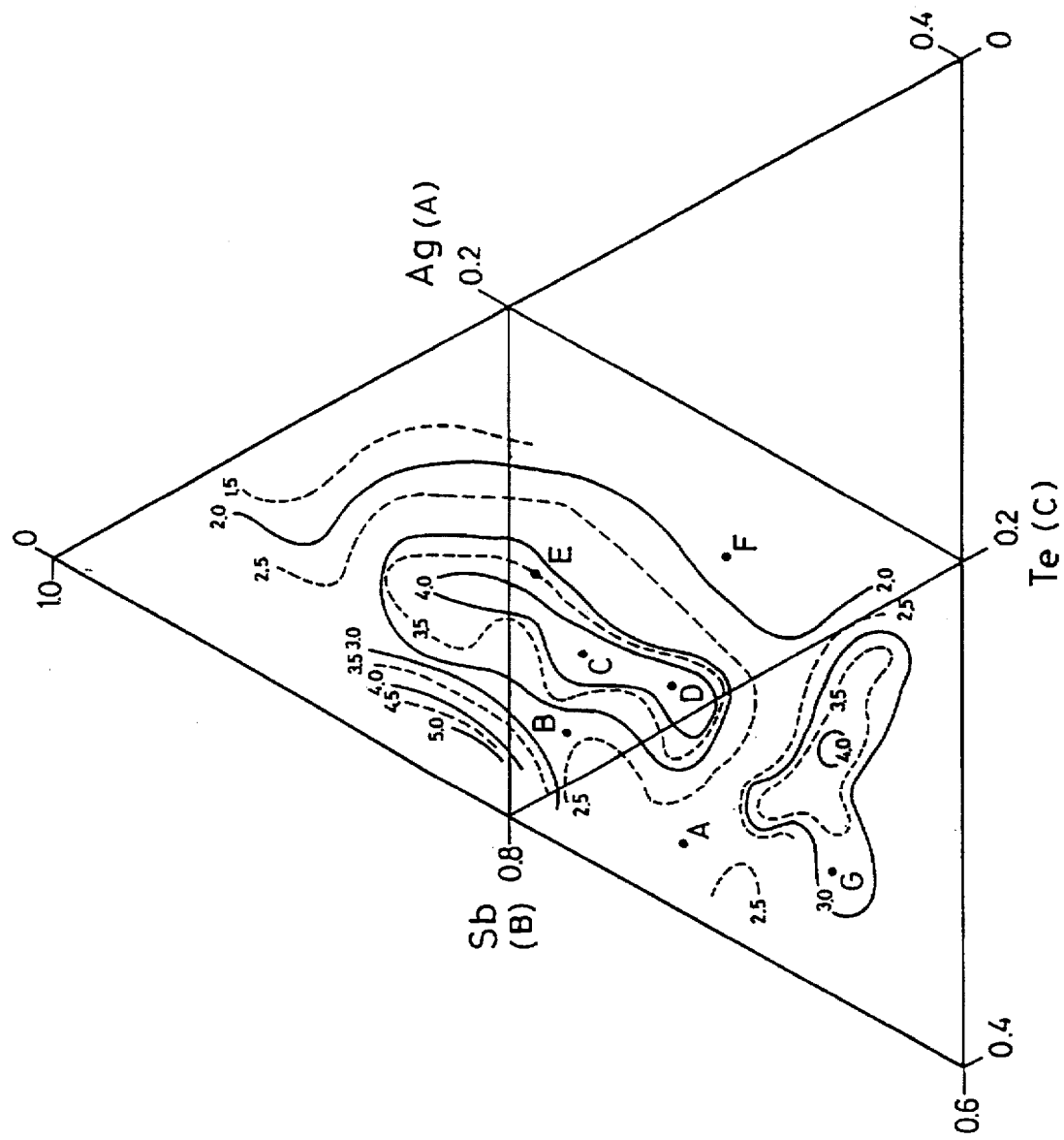
FIG. 2 is a three-component diagram showing the activation energy of a recording layer relative to the proportion of Ag, Sb and Te in the layer.

The same measurement was repeated on samples wherein the recording layer has different compositions, for examining the relationship of activation energy to the composition of recording layer. For the composition of recording layer, an In content of 2.0 at % and a V content of 1.5 at % were fixed while the contents of Ag, Sb, and Te were varied. The composition of recording layer was determined by inductively coupled plasma (ICP) spectrometry. FIG. 2 is a ternary diagram showing the relationship of activation energy to the composition of recording layer. Contour lines of activation energy are depicted in FIG. 2.

Next, optical recording discs were manufactured which had recording layers of the composition corresponding to points A, B, C, D, E, F, and G in the diagram of FIG. 2. The substrate was obtained by injection molding polycarbonate into a disc shape having a diameter of 133 mm and a thickness of 1.2 mm while grooves were simultaneously formed on one major surface thereof. On the grooved surface of the substrate, a lower dielectric layer, a recording layer, and an upper dielectric layer as used for the test sample were deposited. A reflective layer and a protective layer were formed thereon. This resulted in optical recording discs of the structure shown in FIG. 1. The upper dielectric layer was 50 nm thick. The reflective layer was formed by sputtering a target of Al-Ni to a thickness of 100 nm. The protective layer was formed by applying a UV curable resin by spin coating and exposing it to UV for curing. The protective layer as cured had a thickness of 5 μm.

These optical recording discs were initialized by means of a bulk eraser for crystallizing the recording layer. After the initialization, the recording layers were analyzed by a transmittance electron microscope, EPMA, and X-ray microanalysis to find a crystalline mixture of $AgSbTe_2$, Sb, and InTe phases.

While the discs were rotated at a linear velocity of 19 m/s, signals of 13.5 MHz were recorded and then read for measuring the C/N of read signals. The laser beam used had a wavelength of 780 nm. After recording, the discs were stored under conditions of 80° C. and RH 80% for examining the reliability of their recording layer. Reliability can be evaluated in terms of a C/N change and an increase of record mark reflectance although Table 1 reports reliability evaluated in terms of a storage time taken until the C/N dropped to less than 45 dB.

TABLE 1

| Recording layer composition | Activation energy (eV) | Reliability (hr.) |
|---|---|---|
| A | 2.3 | 200 |
| B | 2.8 | 250 |
| C | 4.2 | 1000 |
| D | 4.3 | 1200 |
| E | 3.5 | 800 |
| F | 1.7 | 150 |
| G | 3.2 | 500 |

It is evident from Table 1 that a storage time of more than 400 hours indicating full reliability is obtained in the region where the activation energy is more than 3.0 eV. It is also seen that reliability drastically improves when the activation energy exceeds 3.0 eV. It is noted that the optical discs shown in Table 1 had an initial C/N of 55 to 58 dB.

For comparison purposes, a test sample was prepared in which the upper dielectric layer on the recording layer was omitted. This comparative sample was measured for activation energy and compared with the test sample having the upper dielectric layer. The recording layer of both the samples had the composition corresponding to point E in FIG. 2. The test sample having the upper dielectric layer gave an activation energy of 3.5 eV whereas the comparative sample gave an activation energy of 4.1 eV. This indicates that in the absence of the overlying dielectric layer, the activation energy measured was higher by 0.6 eV. Similar results were obtained when the composition of the recording layer was varied.

Equivalent results were obtained when at least part of Sb in the recording layer was replaced by Bi in each of the foregoing samples. However, when the Bi replacement exceeded 80 atom % of the Sb, the recording layer had an increased coefficient of absorption so that an optically possible differential reflectance between crystalline and amorphous states was reduced, resulting in a reduced modulation factor.

Equivalent results were obtained when at least part of V in the recording layer was replaced by Ti in each of the foregoing samples. Also equivalent results were obtained when at least part of V in the recording layer was replaced by Zr, Hf, Nb, Ta, Mn, W, Mo or a mixture thereof in each of the foregoing samples. When at least part of Ag in the recording layer was replaced by Au in each of the foregoing samples, a crystallization rate was slightly accelerated as compared with the sole use of Ag. Equivalent results to the sole use of Ag were achieved by increasing the amount of V added.

When V was eliminated from the recording layer in each of the foregoing samples, there occurred a little drops of C/N and modulation factor both before and after storage.

The advantages of the invention are evident from the results of the foregoing samples.

Japanese Patent Application No. 56630/1995 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. An optical recording medium comprising a substrate, a phase change recording layer thereon, and a dielectric layer on the recording layer, said recording layer having a composition of the following formula:

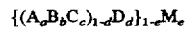

wherein A is at least one element of silver and gold, B is at least one element of antimony and bismuth, C is at least one element of tellurium and selenium, D is indium or a mixture of indium and at least one of aluminum and phosphorus, M is at least one element selected from the group consisting of Ti, Zr, Hf, V, Nb, Ta, Mn, W, and Mo, letters a, b, c, d, and e representing atomic ratios fall in the range:

$0 < a \leq 0.20$,
$0.6 \leq b < 1$,
$0 < c < 0.40$,
$a+b+c=1$,
$0 < d < 0.06$, and
$0 \leq e \leq 0.20$, and said recording layer having an activation energy of at least 3.0 eV.

2. The optical recording medium of claim 1 wherein said letters a, b, c, d and e fall in the range:

$0.03 \leq a \leq 0.18$,
$0.70 \leq b \leq 0.85$,
$0.10 \leq c \leq 0.35$,
$a+b+c=1$,
$0.02 \leq d \leq 0.05$, and
$0.001 \leq e \leq 0.10$.

3. The optical recording medium of claim 1 wherein the activation energy of said recording layer is determined from the crystallization temperature versus heating rate of the recording layer sandwiched between dielectrics.

4. The optical recording medium of claim 3 wherein the crystallization temperature of the recording layer is determined by measuring the light transmittance or reflectance of the recording layer.

5. A method for determining the activation energy of a thin film comprising the steps of:

heating the thin film sandwiched between dielectrics on a substrate at a given rate, measuring the crystallization temperature of the thin film measuring at least one of the light transmittance and reflectance of said thin film, and determining the activation energy from the crystallization temperature versus the heating rate.

6. The method of claim 5 wherein said thin film is 10 to 100 nm thick.

7. The method of claim 5 wherein said substrate is made of resin.

* * * * *

UNITED STATES PATENT AND TRADEMARK OFFICE
CERTIFICATE OF CORRECTION

PATENT NO. : 5,637,371
DATED : 10 June 97
INVENTOR(S) : Junji TOMINAGA ET AL.

It is certified that error appears in the above-identified patent and that said Letters Patent is hereby corrected as shown below:

Column 12, line 53, after "thin film" insert --by--

Signed and Sealed this

Nineteenth Day of August, 1997

*Attest:*

*Attesting Officer*

BRUCE LEHMAN
*Commissioner of Patents and Trademarks*